(12) United States Patent
Thai et al.

(10) Patent No.: US 11,077,629 B2
(45) Date of Patent: Aug. 3, 2021

(54) VACUUM PRESSURIZED MOLDING

(71) Applicant: ROHR, INC., Chula Vista, CA (US)

(72) Inventors: Bryan Thai, Poway, CA (US); Patrick J. Nolan, Laguna Hills, CA (US)

(73) Assignee: Rohr, Inc., Chula Vista, CA (US)

( * ) Notice: Subject to any disclaimer, the term of this patent is extended or adjusted under 35 U.S.C. 154(b) by 439 days.

(21) Appl. No.: 16/026,904

(22) Filed: Jul. 3, 2018

(65) Prior Publication Data
US 2020/0009806 A1    Jan. 9, 2020

(51) Int. Cl.
| | |
|---|---|
| *B29C 70/44* | (2006.01) |
| *B29C 33/68* | (2006.01) |
| *B29C 35/02* | (2006.01) |
| *B29C 43/36* | (2006.01) |
| *B29C 70/30* | (2006.01) |
| *B29C 70/54* | (2006.01) |
| *B29L 31/00* | (2006.01) |

(52) U.S. Cl.
CPC ............ *B29C 70/443* (2013.01); *B29C 33/68* (2013.01); *B29C 35/0227* (2013.01); *B29C 43/3642* (2013.01); *B29C 70/30* (2013.01); *B29C 70/547* (2013.01); *B29C 2043/3657* (2013.01); *B29L 2031/7504* (2013.01)

(58) Field of Classification Search
CPC ..... B29C 70/443; B29C 70/547; B29C 33/68; B29C 35/0227; B29C 43/3642; B29L 2031/7504
See application file for complete search history.

(56) References Cited

U.S. PATENT DOCUMENTS

| | | | | |
|---|---|---|---|---|
| 4,062,917 | A | * 12/1977 | Hill | ........................ B29C 33/68 264/102 |
| 4,271,116 | A | * 6/1981 | Jones | ...................... B29C 33/52 264/221 |
| 5,122,323 | A | * 6/1992 | Sullivan, Sr. | ........... B29C 70/44 264/257 |
| 5,433,915 | A | 7/1995 | Yamamoto et al. | |
| 5,464,337 | A | * 11/1995 | Bernardon | ............ B29C 33/302 264/257 |
| 8,652,371 | B2 | 2/2014 | Smith et al. | |
| 8,696,965 | B2 | 4/2014 | Bongiovanni et al. | |

(Continued)

OTHER PUBLICATIONS

European Patent Office, European Search Report dated Nov. 28, 2019 in Application No. 19180947.4.

(Continued)

*Primary Examiner* — Jacob T Minskey
*Assistant Examiner* — Virak Nguon
(74) *Attorney, Agent, or Firm* — Snell & Wilmer L.L.P.

(57) ABSTRACT

A system for forming a composite component includes a close mold tool defining a cavity that corresponds to a shape of the composite component and configured to receive a composite material. The system further includes a perforated release film defining a plurality of openings and configured to be positioned on a surface of the composite material within the cavity. The system further includes a breather configured to be positioned on the perforated release film, to allow a vacuum to be applied to the composite material through the breather and the plurality of openings, and to allow pressurized fluid to be applied to the perforated release film through the breather.

17 Claims, 6 Drawing Sheets

(56) References Cited

U.S. PATENT DOCUMENTS

| | | |
|---|---|---|
| 8,834,782 B2 | 9/2014 | Rodman |
| 9,302,433 B2 | 4/2016 | Carlier et al. |
| 9,802,476 B1 | 10/2017 | Whipple et al. |
| 9,908,993 B1 | 3/2018 | Barnell et al. |
| 2006/0027314 A1 | 2/2006 | Jones et al. |
| 2006/0062950 A1 | 3/2006 | Catella |
| 2017/0341357 A1* | 11/2017 | Dalal .................... B29C 70/541 |

OTHER PUBLICATIONS

Campbell F CED—Campbell Flake C: "Manufacturing processes for advanced composites", Jan. 1, 2004 (dated Jan. 1, 2004), Manufacturing Processes for Advanced Composites, Elsevier Advanced Technology, Oxford, GB, pp. 304-356.

Miracle DB et al: "Curing", Jan. 1, 2001 (Jan. 1, 2001), ASM Handbook / Prepared Under the Direction of the ASM International Handbook Committee, ASM International, Materials Park, Ohio, USA, pp. 486-491.

* cited by examiner

VACUUM PRESSURIZED MOLDING

FIELD

The present disclosure relates to systems and methods for forming composite materials for use in aircraft and gas turbine engine components.

BACKGROUND

Gas turbine engine systems for modern aircraft often include various components that are formed from composite materials. Such composite components may include a combination of fibers and a resin, and may include thermoset composite materials. Conventional methods of manufacturing such composite components may include forming the components and then placing the materials in an autoclave to cure the components. Such a process may be relatively time and labor intensive and relatively expensive. Therefore, systems and methods for forming relatively high quality composite materials at a relatively low cost, time, and effort are desirable.

SUMMARY

Disclosed herein is a system for forming a composite component. The system includes a close mold tool defining a cavity that corresponds to a shape of the composite component and configured to receive a composite material. The system further includes a perforated release film defining a plurality of openings and configured to be positioned on a surface of the composite material within the cavity. The system further includes a breather configured to be positioned on the perforated release film, to allow a vacuum to be applied to the composite material through the breather and the plurality of openings, and to allow pressurized fluid to be applied to the perforated release film through the breather.

In any of the foregoing embodiments, the close mold tool further defines a passageway in fluid communication with the cavity and configured to allow the vacuum and the pressurized fluid to be applied to the breather and the perforated release film.

Any of the foregoing embodiments may also include a vacuum source configured to be coupled to the passageway and configured to apply the vacuum to the cavity.

Any of the foregoing embodiments may also include a pressurized fluid source configured to be coupled to the passageway and configured to apply the pressurized fluid to the cavity.

In any of the foregoing embodiments, the pressurized fluid source is configured to apply pressurized air to the cavity.

Any of the foregoing embodiments may also include a heater configured to apply heat to the close mold tool to heat the composite material in the cavity in order to cause the composite material to at least partially fill the plurality of openings of the perforated release film in response to application of the heat and the vacuum, and in order to cure the composite material in the cavity in response to the application of the heat and the pressurized fluid.

Any of the foregoing embodiments may also include the composite material that includes any thermoset composite material.

In any of the foregoing embodiments, the thermoset composite material includes a plurality of fibers and a resin.

In any of the foregoing embodiments, the perforated release film has a film thickness that is between 1 thousandths of an inch (25.4 micrometers, μm) and 3 thousandths of an inch (76.2 μm), and the breather has a breather thickness that is between 1 thousandth of an inch (25.4 μm) and 10 thousandths of an inch (254 μm).

In any of the foregoing embodiments, the breather includes at least one of woven fiberglass or woven porous amalon.

In any of the foregoing embodiments, the perforated release film includes fluorinated ethylene propylene (FEP).

In any of the foregoing embodiments, the close mold tool includes a metal.

Also disclosed is a system for forming a composite component. The system includes a close mold tool defining a cavity that corresponds to a shape of the composite component and configured to receive a composite material. The system also includes a perforated release film defining a plurality of openings and configured to be positioned on a surface of the composite material within the cavity. The system also includes a breather configured to be positioned on the perforated release film. The system also includes a vacuum source configured to apply a vacuum to the composite material through the breather and the plurality of openings. The system also includes a pressurized fluid source configured to apply a pressurized fluid to the perforated release film through the breather.

Any of the foregoing embodiments may also include a heater configured to apply heat to the close mold tool to heat the composite material in the cavity in order to cause the composite material to at least partially fill the plurality of openings of the perforated release film in response to application of the heat and the vacuum, and in order to cure the composite material in the cavity in response to the application of the heat and the pressurized fluid.

In any of the foregoing embodiments, the pressurized fluid source is configured to apply pressurized air to the cavity.

Also disclosed is a method of forming a composite component. The method includes placing a composite material in a volume defined by a close mold tool. The method further includes placing a perforated release film defining a plurality of openings on the composite material. The method further includes placing a breather on the perforated release film. The method further includes applying a vacuum to the volume to cause the composite material to at least partially fill the plurality of openings of the perforated release film. The method further includes applying a pressurized fluid to the volume to apply pressure to the perforated release film and the composite material.

Any of the foregoing embodiments may also include applying heat to the volume while applying the vacuum to the volume in order to heat the composite material to allow the composite material to fill the at least the portion of the plurality of openings, and applying the heat to the volume while applying the pressurized fluid to the volume in order to cure the composite material.

Any of the foregoing embodiments may also include removing the perforated release film from the composite material after curing of the composite material.

In any of the foregoing embodiments, applying the pressurized fluid to the volume includes applying the pressurized fluid to the volume in response to the composite material filling the at least the portion of the plurality of openings of the perforated release film to reduce a likelihood of the pressurized fluid flowing through the perforated release film.

In any of the foregoing embodiments, applying the pressurized fluid to the volume includes applying pressurized air to the volume.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
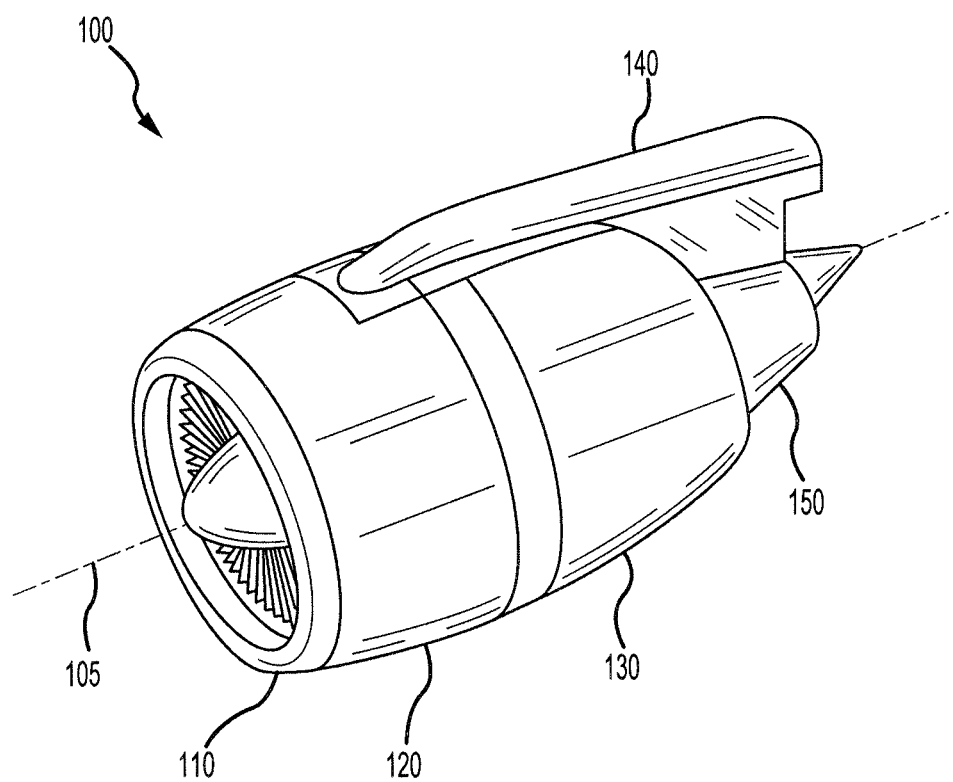
FIG. 1 illustrates a perspective view of a nacelle in accordance with various embodiments.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled to a pylon 140 (only part of which is shown), which may mount the nacelle 100 to an aircraft wing or aircraft body. The nacelle 100 may further comprise an exhaust nozzle 150. The thrust reverser 130 may comprise a cascade-type thrust reverser, in which bypass air is directed through a cascade in order to apply a reverse thrust to an aircraft, such as during landing. The nacelle 100 may be disposed about a centerline 105, which may also be the axis of rotation of an engine located within the nacelle 100.

Figure 2:
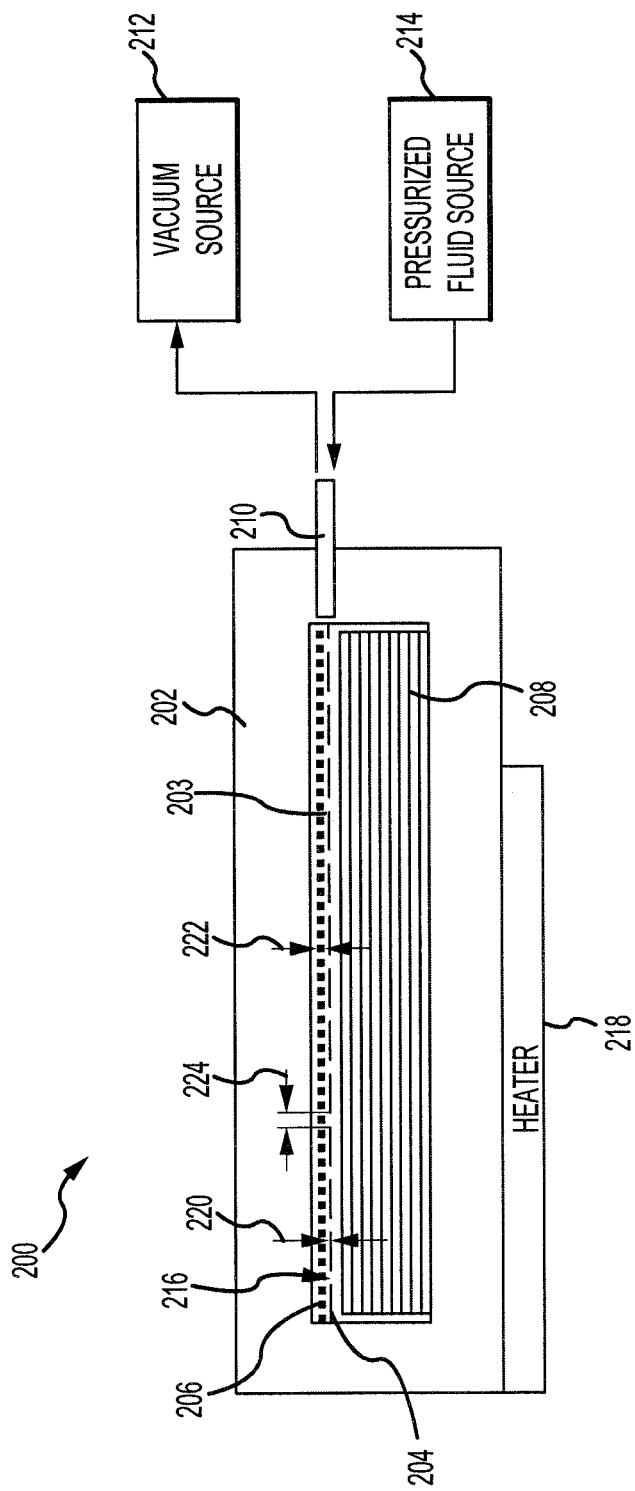
FIG. 2 illustrates a system for forming a composite component using a vacuum and pressurized air in accordance with various embodiments.

Turning now to FIG. 2, a system 200 may be used to form a composite component for use in the nacelle 100 of FIG. 1 or in any other composite component, such as for use in an aircraft, a gas turbine engine, or the like.

The system 200 includes a close mold tool 202 that defines a volume 203. The volume 203 has a shape that corresponds to a desired shape of the final composite component. The close mold tool 202 may include, for example, a metal such as anodized aluminum, steel, or the like. The close mold tool 202 may include any quantity of parts that may fit together to define the volume 203 such as one part, two parts, three parts, or the like.

The system 200 may further include a perforated release film 204. The perforated release film 204 may include any material that defines a plurality of openings 216. For example, the perforated release film 204 may include fluorinated ethylene propylene (FEP) and may be formed or otherwise created to define the plurality of openings 216.

In various embodiments, the perforated release film 204 may include a material having micro-openings that are small enough to prevent fluid from flowing therethrough but sufficiently large to allow air to flow therethrough.

The system 200 may further include a breather 206. The breather 206 may include any woven material that allows a fluid, such as air, to pass therethrough. For example, the breather 206 may include woven fiberglass, a porous polytetrafluoroethylene (PTFE) glass product such as that sold under the mark ARMALON, or the like.

The system 200 may further include a composite material 208. The composite material 208 may include any thermoset material, thermoplastic material, or the like. With brief reference to FIG. 3, the composite material 208 may include a plurality of fibers 300 and a resin 302. The plurality of fibers 300 may include carbon fibers, glass fibers, or the like. The resin 302 may include any resin such as epoxy, bis-Maleimide (BMI), polymethacrylimide (PMI), or the like.

Returning reference to FIG. 2, the system 200 may further include a passageway 210. The passageway 210 may be defined by the close mold tool 202 or may be a separate component that extends through at least a portion of the close mold tool 202.

The passageway 210 may be in fluid communication with the volume 203. The system 200 may further include a vacuum source 212 and a pressurized fluid source 214 which may each be permanently or removably coupled to the passageway 210. In various embodiments, the vacuum source 212 and the pressurized fluid source 214 may be separate components and, in various embodiments, the vacuum source 212 and the pressurized fluid source 214 may be the same component. The vacuum source 212 may be designed to apply a vacuum to the volume 203, and the pressurized fluid source 214 may be designed to apply a pressurized fluid to the volume 203. For example, the pressurized fluid may include pressurized air.

The system 200 may further include a heater 218. The heater 218 may be designed to apply a heat to the close mold tool 200, or directly to the volume 203. In either case, the heat applied by the heater 218 may be applied to the composite material 208 within the volume 203.

The perforated release film 204 may have a film thickness 220. In various embodiments, the film thickness 220 may be between 0.5 thousandths of an inch (0.5 mils, 12.7 micrometers, μm) and 10 mils (254 μm), between 1 mil (25.4 μm) and 5 mils (127 μm), or between 1 mil (25.4 μm) and 3 mils (76.2 μm).

The breather 206 may have a breather thickness 222. In various embodiments, the breather thickness 222 may be between 0.5 thousandths of an inch (0.5 mils, 12.7 micrometers, μm) and 20 mils (508 μm), between 1 mil (25.4 μm) and 15 mils (381 μm), or between 1 mil (25.4 μm) and 3 mils (254 μm).

The plurality of openings 216 may each have an opening width 224. In various embodiments, the opening width 224 may be between 5 mils (127 μm) and 100 mils (2540 μm), between 10 mils (254 μm) and 75 mils (1905 μm), or between 25 mils (635 μm) and 75 mils (1905 μm).

In order to form the composite part, the composite material 208 may be placed in the volume 203. The perforated release film 204 may then be placed on the composite material 208, and the breather 206 may be placed on the perforated release film 204. The close mold tool 202 may then be closed such that the passageway 210 is in fluid communication with the volume 203. The vacuum source 212 may apply a vacuum to the volume 203 while the heater 218 simultaneously applies heat to the volume 203. The heat that is applied to the volume 203 may be, for example, between 70 degrees Fahrenheit (70 degrees F., 21.1 degrees Celsius (C.)) and 450 degrees F. (232 degrees C.), between 70 degrees F. (21.1 degrees C.) and 250 degrees F. (121 degrees C.), or between 70 degrees F. (21.1 degrees C.) and 200 degrees F. (93.3 degrees C.).

Figure 3:
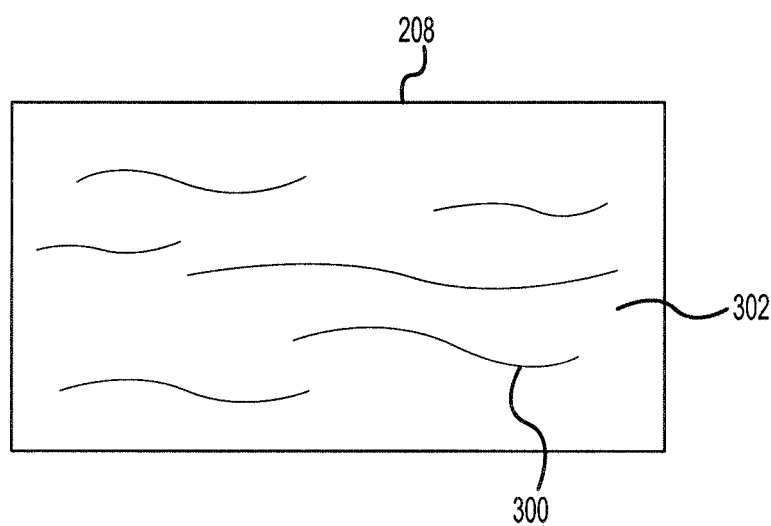
FIG. 3 illustrates a composite material usable to form the composite component of FIG. 2 in accordance with various embodiments.

Referring to FIGS. 2 and 3, the heater 218 may cause the resin 302 to melt, and the vacuum source 212 may cause the resin 302 to at least partially fill the plurality of openings 216. Stated differently, at least one of the plurality of openings 216 may receive a portion of the resin 302. In response to the resin 302 at least partially filling the plurality of openings 216, the vacuum source 212 may be removed from the passageway 210 and the pressurized fluid source 214 may be coupled to the passageway 210. For example, a calculation may be performed to determine how much time the heat and vacuum should be applied until the plurality of openings 216 are at least partially filled, and the vacuum may be removed after the period of time. In various embodiments, this amount of time may correspond to a maximum time and heat to be applied to the resin 302. As another example, an operator may watch the system 200 and may remove the vacuum in response to observing the resin 302 in the plurality of openings 216.

At least partially filling the plurality of openings 216 means that at least some resin 302 is in at least one of the plurality of openings 216, i.e., that at least one of the plurality of openings 216 is at least partially filled with the resin 302.

The pressurized fluid source 214 may then apply a pressurized fluid, such as pressurized air, to the volume 203. Because the resin 302 is in fluid form at this point in time, the pressurized fluid from the pressurized fluid source 214 may fail to flow through the perforated release film 204 to the composite material 208. The heater 218 may continue to apply the heat as the pressurized fluid source 214 applies the pressurized fluid, thus curing the composite material 208.

After curing of the composite material 208, the composite material 208 may be removed from the close mold tool 202. Additionally, the perforated release film 204 and the breather 206 may be removed from the composite material 208, resulting in the composite component.

Figure 4:
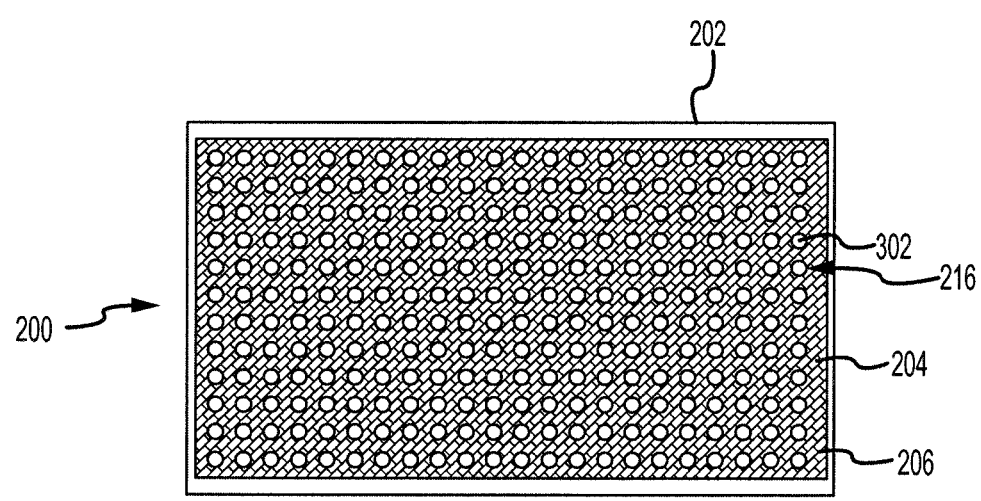
FIG. 4 illustrates a top-down view of the system of FIG. 2 in accordance with various embodiments.

Referring briefly to FIG. 4, a top-down cross-sectional view of the system 200 after application of the heat and the vacuum is shown. As shown, the breather 206 is located on the perforated release film 204. As additionally shown, the resin 302 has at least partially filled the plurality of openings 216 defined by the perforated release film 204. Thus, the perforated release film 204 is now less porous, reducing the likelihood of the pressurized fluid reaching the composite material beneath the perforated release film 204.

Figure 5:
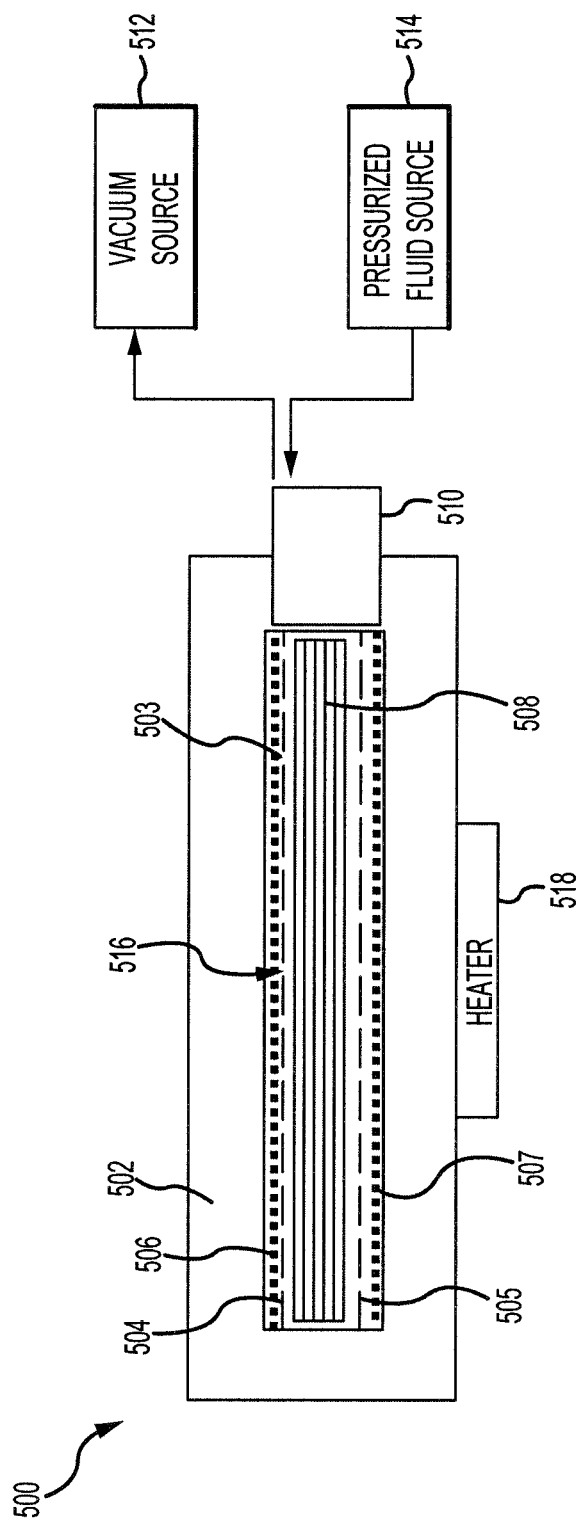
FIG. 5 illustrates a system for forming a composite component using a vacuum and pressurized air in accordance with various embodiments.

Turning now to FIG. 5, another system 500 for forming a composite component is shown. The system 500 is similar to the system 200 of FIG. 2, but includes two perforated release films 504, 505 and two breathers 506, 507. Each of the perforated release films 504, 505 is similar to the perforated release film 204 of FIG. 2 and defines a plurality of openings 516. Each of the breathers 506, 507 is similar to the breather 206 of FIG. 2 and may include woven fibers. The system 500 further includes a close mold tool 502 that defines a volume 503. The system 500 may include any quantity of perforated release films 504, 505 and any quantity of breathers 506, 506.

The system further includes a passageway 510, a vacuum source 512, a pressurized fluid source 514, and a heater 518 that are similar to the corresponding components of the system 200 of FIG. 2. As the heater 518 applies heat to the composite material 508 and the vacuum source 512 applies a vacuum to the volume 503, resin of the composite material 508 may fill the plurality of openings 516 of the perforated release films 504, 505. After the plurality of openings 516 are at least partially full of resin, the vacuum source 512 may be removed, and the pressurized fluid source 514 may apply pressurized fluid to the volume 503. The pressure and heat may cure the composite material 508. After curing of the composite material, the perforated release films 504, 505 and the breathers 506, 507 may be removed to form the final composite component.

Figure 6:
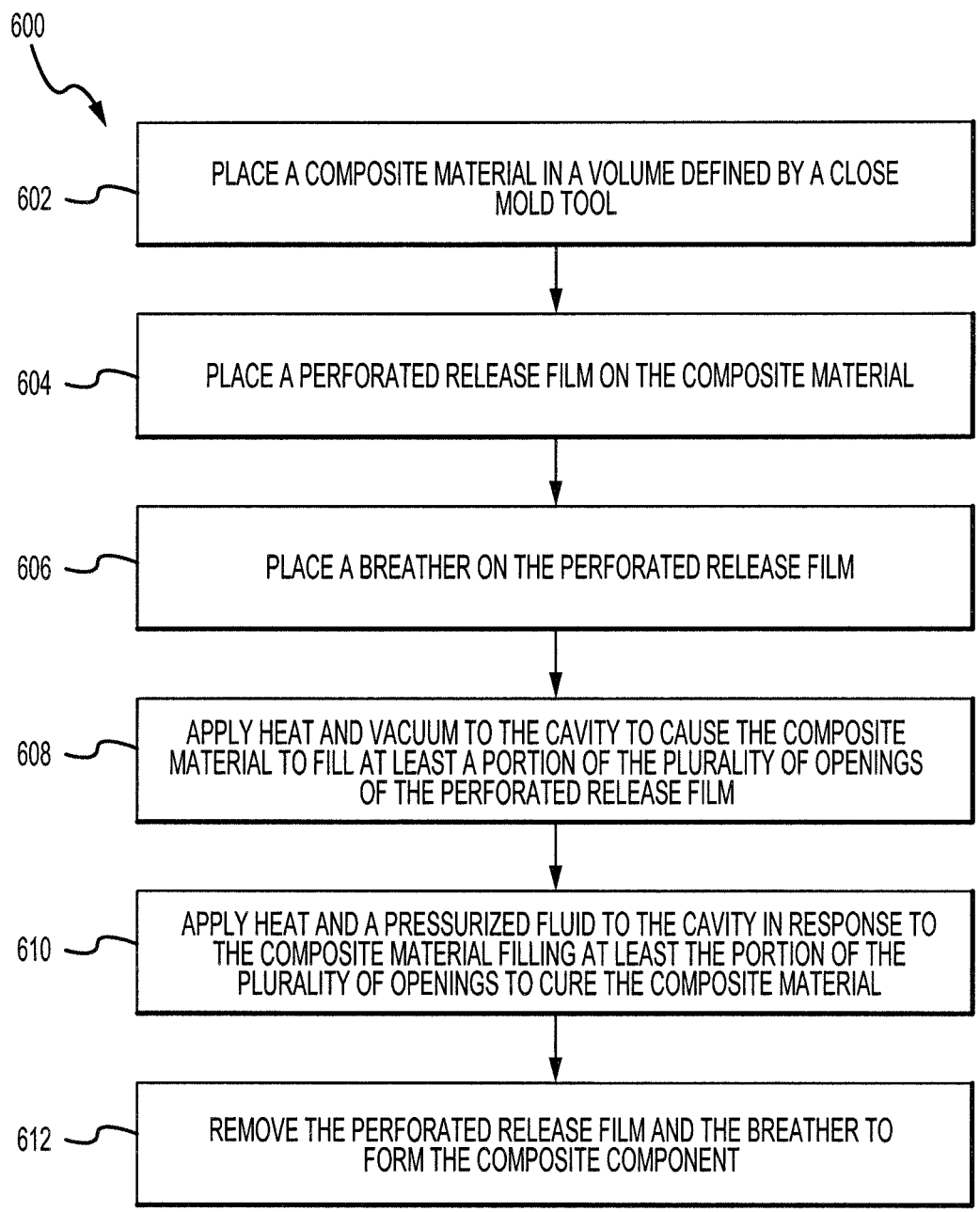
FIG. 6 illustrates a method for forming a composite component using a vacuum and pressurized air in accordance with various embodiments.

Referring now to FIG. 6, a method 600 for forming a composite component is shown. The method 600 may be performed using a system similar to the system 200 of FIG. 2 or the system 500 of FIG. 5. The method 600 may begin in block 602 in which a composite material may be placed in a volume defined by a close mold tool. The composite material may include, for example, a thermoset material such as a combination of fibers and a resin.

In block 604, a perforated release film may be placed on the composite material, such as on a surface of the composite material. The perforated release film may include a plurality of openings.

In block 606, a breather may be placed on the perforated release film. The breather may be designed to allow fluid to flow therethrough. For example, the breather may include a woven material such as woven fiberglass or porous ARMALON.

In block 608, the close mold tool may be closed, and heat and a vacuum may be applied to the cavity. Application of the heat and the vacuum may cause some of the composite material (such as resin) to fill at least one of the openings of the perforated release film.

In response to the composite material filling the at least the portion of the plurality of openings, the method 600 may proceed to block 610. In block 610, the heat may continue to be applied and a pressurized fluid may also be applied to the cavity. In various embodiments, the heat applied in block 610 may be greater than, or less than, the amount of heat applied in block 608. Application of the pressurized fluid and the heat in block 610 may result in curing of the composite material.

In block 612, the close mold tool may be opened and the composite material, the perforated release film, and the breather may be removed. Additionally, the perforated release film may be removed from the composite material, further removing the breather from the composite material and resulting in the final composite component.

In various embodiments, a surface treatment may be applied to the surface of the composite component from which the perforated release film was removed. For example, the surface treatment may include application of a surface treatment film, cleaning of the surface, or the like.

Use of the method 600 may provide advantages over conventional methods, such as use of an autoclave. For example, use of the method 600 is less time and effort intensive and results in higher-quality parts than use of an autoclave.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for forming a composite component, comprising:
    a close mold tool defining a cavity that corresponds to a shape of the composite component and configured to receive a composite material, the close mold tool further defining a passageway in fluid communication with the cavity;
    a perforated release film defining a plurality of openings and configured to be positioned on a surface of the composite material within the cavity;
    a breather configured to be positioned on the perforated release film, to allow a vacuum to be applied to the composite material through the breather and the plurality of openings, and to allow pressurized fluid to be applied to the perforated release film through the breather;
    a vacuum source configured to be coupled to the passageway and configured to apply the vacuum to the cavity via the passageway; and
    a pressurized fluid source configured to be coupled to the passageway after the vacuum source has been removed from the passageway and configured to apply the pressurized fluid to the cavity via the passageway.

2. The system of claim 1, wherein the pressurized fluid source is configured to apply pressurized air to the cavity.

3. The system of claim 1, further comprising a heater configured to apply heat to the close mold tool to heat the composite material in the cavity in order to cause the composite material to at least partially fill the plurality of openings of the perforated release film in response to application of the heat and the vacuum, and in order to cure the composite material in the cavity in response to the application of the heat and the pressurized fluid.

4. The system of claim 1, further comprising the composite material that includes any thermoset composite material.

5. The system of claim 4, wherein the thermoset composite material includes a plurality of fibers and a resin.

6. The system of claim 1, wherein the perforated release film has a film thickness that is between 1 thousandths of an inch (25.4 micrometers, µm) and 3 thousandths of an inch (76.2 µm), and the breather has a breather thickness that is between 1 thousandth of an inch (25.4 µm) and 10 thousandths of an inch (254 µm).

7. The system of claim 1, wherein the breather includes at least one of woven fiberglass or a porous polytetrafluoroethylene (PTFE) glass product.

8. The system of claim 1, wherein the perforated release film includes fluorinated ethylene propylene (FEP).

9. The system of claim 1, wherein the close mold tool includes a metal.

10. A system for forming a composite component, comprising:
    a close mold tool defining a cavity that corresponds to a shape of the composite component and configured to receive a composite material, the close mold tool further defining a passageway in fluid communication with the cavity;

a perforated release film defining a plurality of openings and configured to be positioned on a surface of the composite material within the cavity;

a breather configured to be positioned on the perforated release film;

a vacuum source configured to be coupled to the passageway and to apply a vacuum to the composite material through the breather and the plurality of openings via the passageway; and a pressurized fluid source configured to be coupled to the passageway after the vacuum source has been removed from the passageway and to apply a pressurized fluid to the perforated release film through the breather via the passageway.

11. The system of claim 10 further comprising a heater configured to apply heat to the close mold tool to heat the composite material in the cavity in order to cause the composite material to at least partially fill the plurality of openings of the perforated release film in response to application of the heat and the vacuum, and in order to cure the composite material in the cavity in response to the application of the heat and the pressurized fluid.

12. The system of claim 10 wherein the pressurized fluid source is configured to apply pressurized air to the cavity.

13. A method of forming a composite component, comprising:

placing a composite material in a volume defined by a close mold tool, the close mold tool further defining a passageway in fluid communication with the cavity;

placing a perforated release film defining a plurality of openings on the composite material;

placing a breather on the perforated release film;

applying a vacuum to the volume via the passageway to cause the composite material to at least partially fill the plurality of openings of the perforated release film;

removing the vacuum from the passageway; and applying a pressurized fluid to the volume via the passageway after removing the vacuum from the passageway to apply pressure to the perforated release film and the composite material.

14. The method of claim 13 further comprising applying heat to the volume while applying the vacuum to the volume in order to heat the composite material to allow the composite material to fill the at least the portion of the plurality of openings, and applying the heat to the volume while applying the pressurized fluid to the volume in order to cure the composite material.

15. The method of claim 14 further comprising removing the perforated release film from the composite material after curing of the composite material.

16. The method of claim 13 wherein applying the pressurized fluid to the volume includes applying the pressurized fluid to the volume in response to the composite material filling the at least the portion of the plurality of openings of the perforated release film to reduce a likelihood of the pressurized fluid flowing through the perforated release film.

17. The method of claim 13 wherein applying the pressurized fluid to the volume includes applying pressurized air to the volume.

* * * * *